(12) United States Patent
Dailly et al.

(10) Patent No.: US 11,446,903 B2
(45) Date of Patent: Sep. 20, 2022

(54) MULTILAYER GLASS PANEL FOR A VEHICLE AND METHOD OF MAKING THE SAME

(71) Applicant: GM GLOBAL TECHNOLOGY OPERATIONS LLC, Detroit, MI (US)

(72) Inventors: Anne M. Dailly, West Bloomfield, MI (US); Mei Cai, Bloomfield Hills, MI (US); Michael D. Richardson, Troy, MI (US); Todd J. Gordon, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 78 days.

(21) Appl. No.: 16/694,376

(22) Filed: Nov. 25, 2019

(65) Prior Publication Data

US 2021/0154979 A1     May 27, 2021

(51) Int. Cl.
| | | |
|---|---|---|
| *B32B 17/10* | (2006.01) | |
| *B32B 9/00* | (2006.01) | |
| *B32B 27/20* | (2006.01) | |
| *B32B 27/22* | (2006.01) | |

(52) U.S. Cl.
CPC ........ *B32B 17/10036* (2013.01); *B32B 9/007* (2013.01); *B32B 17/10743* (2013.01); *B32B 17/10761* (2013.01); *B32B 27/20* (2013.01); *B32B 27/22* (2013.01); *B32B 2307/302* (2013.01)

(58) Field of Classification Search
None
See application file for complete search history.

(56) References Cited

U.S. PATENT DOCUMENTS

| | | | | |
|---|---|---|---|---|
| 3,740,281 | A * | 6/1973 | Yasubaru | H05B 3/86 156/99 |
| 9,332,632 | B2 * | 5/2016 | Schneider | B32B 5/16 |
| 9,962,909 | B2 | 5/2018 | Mizrahi et al. | |
| 2016/0082705 | A1* | 3/2016 | Fisher | C03C 27/10 428/215 |
| 2019/0291389 | A1* | 9/2019 | Yamamoto | B32B 17/10559 |
| 2020/0023620 | A1* | 1/2020 | Isoue | B32B 3/266 |
| 2021/0046738 | A1 | 2/2021 | Izu et al. | |

FOREIGN PATENT DOCUMENTS

| | | | | |
|---|---|---|---|---|
| JP | 2011178655 | A * | 9/2011 | ....... B32B 17/10688 |
| WO | 2007039747 | A1 | 4/2007 | |

OTHER PUBLICATIONS

Yahara, Kazuyuki et al., JP 2011178655A, Sep. 15, 2011 (Machine translation) (Year: 2011).*
Chinese Office Action for the corresponding Chinese Application No. 2020112930219; dated Jul. 20, 2022; 2 pages.

* cited by examiner

*Primary Examiner* — Cheng Yuan Huang
(74) *Attorney, Agent, or Firm* — Cantor Colburn LLP

(57) ABSTRACT

Disclosed is a multilayer panel, comprising: a center layer comprising graphene, wherein the center layer comprises a first surface and an opposing second surface; a first polymer layer deposited on the first surface of the center layer and a second polymer layer deposited on the second surface of the center layer; and a first glass layer deposited on an outer surface of the first polymer layer and a second glass layer deposited on an outer surface of the second polymer layer; wherein the first polymer layer, the second polymer layer, or any combination(s) thereof comprise carbon filler.

17 Claims, 4 Drawing Sheets

MULTILAYER GLASS PANEL FOR A VEHICLE AND METHOD OF MAKING THE SAME

The subject disclosure relates to the art of multilayer glass panels, and more particularly, to laminated glass panels as windshields for vehicles.

Vehicles, such as automobiles, include glass windshields. These glass windshields can be put in electrical connection with an electricity source located within the vehicle. When desired, an electric current from the electricity source can be activated and applied to the windshield, thus creating heat within the windshield. This heat can then travel via thermal conduction through the windshield. In this way, unwanted weather elements such as frost, located on an exterior surface of the windshield, can be melted and removed. However, glass is known as a thermal and electrical insulator. This heating and melting process can be slow and ineffective. Vehicle windshields must also possess good optical and mechanical properties for visibility and safety purposes.

Accordingly, it is desirable to provide a laminated glass panel, for example, a vehicle windshield, which possesses improved thermal and electrical conduction properties without sacrificing optical and mechanical properties.

SUMMARY

In one exemplary embodiment, a multilayer panel comprises a center layer comprising graphene, wherein the center layer comprises a first surface and an opposing second surface. A first polymer layer is deposited on the first surface of the center layer and a second polymer layer is deposited on the second surface of the center layer. A first glass layer is deposited on an outer surface of the first polymer layer and a second glass layer is deposited on an outer surface of the second polymer layer. The first polymer layer, the second polymer layer, or any combination(s) thereof comprise carbon filler.

In addition to one or more of the features described herein, the first polymer layer, the second polymer layer, or any combination(s) thereof, comprise polyvinyl butyral, ethylene-vinyl acetate, ethylene-methacrylic acid, or any combination(s) thereof.

In addition to one or more of the features described herein, the first polymer layer, the second polymer layer, or any combination(s) thereof, comprise two or more materially distinct zones.

In addition to one or more of the features described herein, the materially distinct zones comprise graphene, tungsten wiggle wire, metal nanowire, or any combination(s) thereof.

In addition to one or more of the features described herein, the materially distinct zones are a zone A, a zone B, and a zone C, wherein the zone A comprises graphene, the zone B comprises graphene and metal nanowire, and the zone C comprises graphene and metal nanowire.

In addition to one or more of the features described herein, a thermal conductivity of the zone B, the zone C, or any combination(s) thereof, is greater than a thermal conductivity of the zone A.

In addition to one or more of the features described herein, the carbon filler comprises graphene, carbon nano ribbons, carbon nano platelets, single-walled carbon nano tubes, multi-walled carbon nano tubes, expanded graphite, carbon black, carbon fiber, or any combination(s) thereof.

In addition to one or more of the features described herein, the first polymer layer, the second polymer layer, or any combination(s) thereof, comprise about 0.1 weight percent to about 10 weight percent of the carbon filler based on a total weight of the respective polymer layer.

In addition to one or more of the features described herein, a visible light transmission value of the multilayer panel is greater than or equal to about 70%.

In addition to one or more of the features described herein, a thermal conductivity of the multilayer panel is greater than or equal to about 10 watts per meter kelvin.

In addition to one or more of the features described herein, a thickness of the center layer is about 1 nanometer to about 1.2 nanometers.

In addition to one or more of the features described herein, a thickness of the first polymer layer, the second polymer layer, or any combination(s) thereof is about 0.38 millimeters to about 0.76 millimeters.

In addition to one or more of the features described herein, a thickness of the first glass layer, the second glass layer, or any combination(s) thereof is about 1.4 millimeters to about 2.3 millimeters.

In addition to one or more of the features described herein, the first glass layer, the second glass layer, or any combination(s) thereof, comprise annealed glass.

In addition to one or more of the features described herein, an electrical conductivity of the multilayer panel is greater than or equal to about 0.1 Siemens per meter.

In addition to one or more of the features described herein, the first polymer layer, the second polymer layer, or any combination(s) thereof, comprise about 0.1 weight percent to about 1.0 weight percent of a plasticizer based on a total weight of the respective polymer layer, wherein the plasticizer comprises phthalate, terephthalate, trimellitate, adipate, epoxy, or any combination(s) thereof.

In addition to one or more of the features described herein, a glass transition temperature of the first polymer layer, the second polymer layer, or any combination(s) thereof is greater than or equal to about 20° C.

In another exemplary embodiment, a vehicle comprises a multilayer panel in electrical connection with an electricity source, wherein the multilayer panel is a front windshield, rear windshield, side door window, roof window, or any combination(s) thereof. The multilayer panel comprises a center layer comprising graphene, wherein the center layer comprises a first surface and an opposing second surface. A first polymer layer is deposited on the first surface of the center layer and a second polymer layer is deposited on the second surface of the center layer. A first glass layer is deposited on an outer surface of the first polymer layer and a second glass layer is deposited on an outer surface of the second polymer layer. The first polymer layer, the second polymer layer, or any combination(s) thereof comprise carbon filler.

In addition to one or more of the features described herein, the vehicle is an automobile, a boat, an aircraft, a spacecraft, a train, or any combination(s) thereof.

In yet another exemplary embodiment, a multilayer panel comprises a center layer comprising graphene, wherein the center layer comprises a first surface and an opposing second surface. A first polymer layer is deposited on the first surface of the center layer and a second polymer layer is deposited on the second surface of the center layer. A first glass layer is deposited on an outer surface of the first polymer layer and a second glass layer is deposited on an outer surface of the second polymer layer. The first polymer layer, the second polymer layer, or any combination(s)

thereof comprise carbon filler. A method of making the multilayer panel comprises combining a polymer, the carbon filler, and a plasticizer to form the first and second polymer layers, depositing the polymer layers on the respective surfaces of the center layer, and laminating the polymer layers and center layer between the first and second glass layers.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses.

Figure 1:
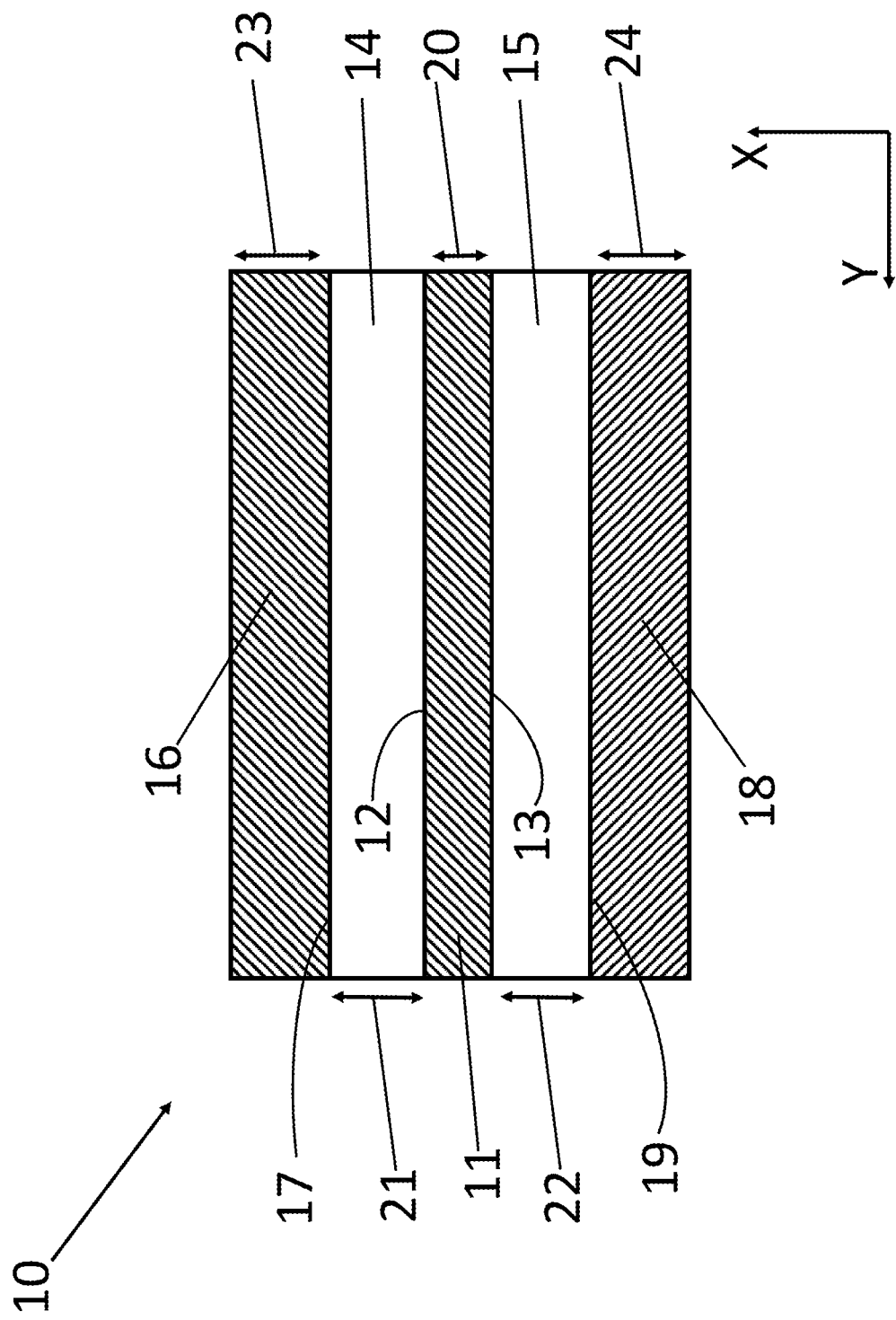
FIG. 1 is a cross-section of a multilayer panel according to an exemplary embodiment.

In accordance with an exemplary embodiment, a multilayer panel 10, as shown in FIG. 1, can comprise a center layer 11. The center layer 11 can comprise graphene. The term "graphene" can refer to an allotrope of carbon in the form of a single layer of atoms in a two-dimensional hexagonal lattice in which one atom forms each vertex. The center layer 11 can comprise a single layer of graphene or multiple layers of graphene. The center layer 11 can comprise a combination of graphene and nanowires (e.g., silver nanowires and/or copper nanowires). The center layer 11 can comprise a first surface 12 and an opposing second surface 13. A thickness 20 of the center layer 11 (measured in the "X" direction as shown in FIG. 1) can be about 0.95 nanometers to about 1.25 nanometers, for example, about 1 nanometer to about 1.2 nanometers, for example, about 1.05 nanometers to about 1.15 nanometers, for example, about 1.1 nanometers.

The multilayer panel 10 can comprise a first polymer layer 14 deposited on the first surface 12 of the center layer 11. For example, the first polymer layer 14 can comprise polyvinyl butyral, ethylene-vinyl acetate, ethylene-methacrylic acid, or any combination(s) thereof. The multilayer panel 10 can comprise a second polymer layer 15 deposited on the second surface 13 of the center layer 11. For example, the second polymer layer 15 can comprise polyvinyl butyral, ethylene-vinyl acetate, ethylene-methacrylic acid, or any combination(s) thereof.

A thickness 21 of the first polymer layer 14 (measured in the "X" direction as shown in FIG. 1) can be about 0.35 millimeters to about 0.8 millimeters, for example, about 0.38 millimeters to about 0.76 millimeters, for example, about 0.4 millimeters to about 0.5 millimeters. A thickness 22 of the second polymer layer 15 (measured in the "X" direction as shown in FIG. 1) can be about 0.35 millimeters to about 0.8 millimeters, for example, about 0.38 millimeters to about 0.76 millimeters, for example, about 0.4 millimeters to about 0.5 millimeters. The thickness 21 of the first polymer layer 14 can be the same or different than the thickness 22 of the second polymer layer 15. For example, the thickness 21 of the first polymer layer 14 can be about 0.5 millimeters and the thickness 22 of the second polymer layer 15 can be about 0.38 millimeters.

The first polymer layer 14, the second polymer layer 15, or any combination(s) thereof comprise carbon filler. For example, the carbon filler can comprise graphene, carbon nano ribbons, carbon nano platelets, single-walled carbon nano tubes, multi-walled carbon nano tubes, expanded graphite, carbon black, carbon fiber, or any combination(s) thereof. The first polymer layer 14, the second polymer layer 15, or any combination(s) thereof can comprise about 0.1 weight percent to about 10 weight percent of the carbon filler based on a total weight of the respective polymer layer, for example, about 1 weight percent to about 5 weight percent. The first polymer layer 14, the second polymer layer 15, or any combination(s) thereof can comprise about 0.1 weight percent to about 1 weight percent of the carbon filler based on a total weight of the respective polymer layer, for example, about 0.25 weight percent to about 0.75 weight percent, for example, about 0.5 eight percent. A weight percent of carbon filler in the first polymer layer 14 can be the same or different than the weight percent of carbon filler in the second polymer layer 15. For example, the first polymer layer 14 can comprise about 0.1 weight percent to about 1 weight percent carbon filler based upon a total weight of the first polymer layer 14.

Without wishing to be bound by theory, the inclusion of carbon filler in the first polymer layer 14 and/or second polymer layer 15 can increase a thermal conductivity of the multilayer panel 10. For example, a thermal conductivity of the multilayer panel 10 can be greater than or equal to about 1 watt per meter kelvin, for example, greater than or equal to about 5 watts per meter kelvin, for example, greater than or equal to about 10 watts per meter kelvin, for example, greater than or equal to about 15 watts per meter kelvin. The thermal conductivity can be measured by any suitable method, for example, a method in accordance with ISO 22007:2017.

An electrical conductivity of the multilayer panel 10 can be greater than or equal to about 0.05 Siemens per meter, for example, greater than or equal to about 0.1 Siemens per meter, for example, greater than or equal to about 0.15 Siemens per meter, for example, greater than or equal to about 0.2 Siemens per meter. The electrical conductivity can be measured by any suitable method, for example, a method in accordance with ISO 9944:1990. A visible light transmission value of the multilayer panel can be greater than or equal to about 70%, for example, greater than or equal to about 75%, for example, greater than or equal to about 80%, for example, greater than or equal to about 85%, for example, greater than or equal to about 90%, for example, greater than or equal to about 95%. The term "visible light" can refer to light wavelengths of about 380 nanometers to about 780 nanometers. The transmission value can be measured by any suitable method, for example, a method in accordance with ISO 3538:1997.

The first polymer layer 14, the second polymer layer 15, or any combination(s) thereof can comprise about 0.1 weight percent to about 10 weight percent of a plasticizer based on a total weight of the respective polymer layer. For example, the plasticizer can comprise phthalate, terephthalate, trimellitate, adipate, epoxy, or any combination(s) thereof. Without wishing to be bound by theory, it is believed that the presence of plasticizer in the first polymer layer 14 and/or the second polymer layer 15 can decrease a glass transition temperature of the respective polymer layer. A glass transition temperature of the first polymer layer 14, the second polymer layer 15, or any combination(s) thereof can be greater than or equal to about 20° C., for example, greater than or equal to about 25° C., for example, greater than or equal to about 30° C. The glass transition temperature can be measured by any suitable method, for example, a method in accordance with ISO 11357:2013.

The first polymer layer 14, the second polymer layer 15, or any combination(s) thereof can further comprise antioxidants, UV blockers, or any combination(s) thereof, for example, pentaerythritol tetrakis(3,5-di-tert-butyl-4-hydroxyhydrocinnamate), benzotriazoles, hydroxyphenyltriazines, oxanilides, benzophenones, or any combination(s) thereof.

The multilayer panel 10 can comprise a first glass layer 16 deposited on an outer surface 17 of the first polymer layer 14 and a second glass layer 18 deposited on an outer surface 19 of the second polymer layer 15. For example, the first glass layer 16, the second glass layer 18, or any combination(s) thereof can comprise annealed glass. A thickness 23 of the first glass layer 16, a thickness 24 of the second glass layer 18 (measured in the "X" direction as shown in FIG. 1), or any combination(s) thereof can be about 1.4 millimeters to about 2.3 millimeters, for example, about 1.4 millimeters to about 2.1 millimeters, for example, about 1.6 millimeters to about 1.8 millimeters. A thickness 23 of the first glass layer 16 can be the same or different than a thickness 24 of the second glass layer 18. For example, a thickness 23 of the first glass layer 16 can be about 2.1 millimeters and a thickness 24 of the second glass layer 18 can be about 1.8 millimeters.

Figure 2:
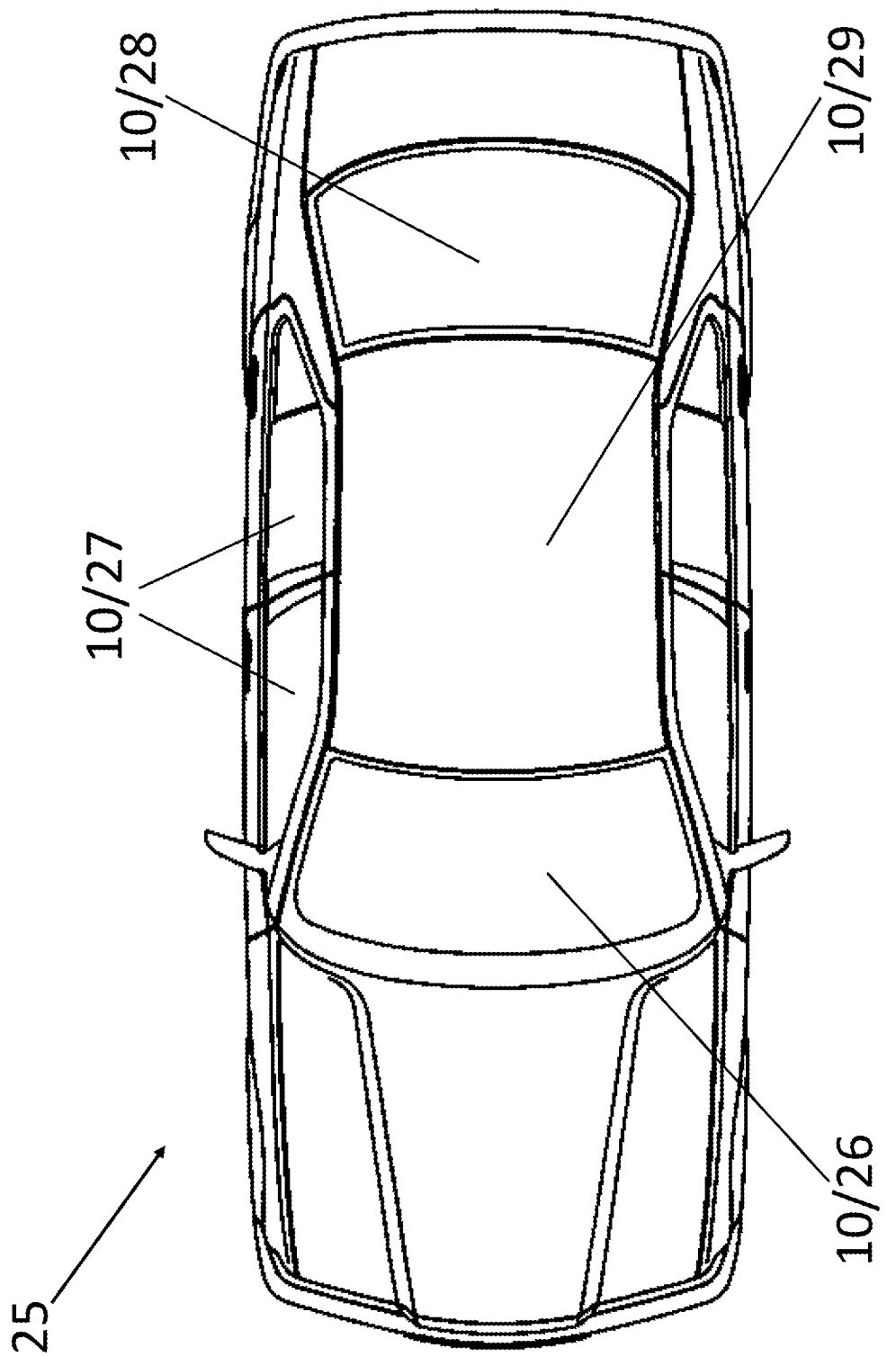
FIG. 2 is a top-down view of a vehicle comprising a multilayer panel according to an exemplary embodiment.

Now referring to FIG. 2, a vehicle 25 can comprise the multilayer panel 10 (as shown in FIG. 1) in electrical connection with an electricity source (not shown). For example, the multilayer panel 10 can be a front windshield 26, rear windshield 28, side door window 27, roof window 29 (e.g., a sun roof and/or moon roof), or any combination(s) thereof. The electricity source can be located within the vehicle 25. An electric current from the electricity source can be applied to the multilayer panel 10, thus creating heat. This heat can then travel through the multilayer panel 10 via thermal conduction. In this way, unwanted weather elements (e.g., frost and/or condensation), located on the multilayer panel 10 (e.g., on the exposed side of the first glass layer 16 and/or the exposed side of the second glass layer 18), can be melted and removed from the multilayer panel 10. An exposed side of the first glass layer 16 and/or the second glass layer 18 of the multilayer panel 10 (as shown in FIG. 1) can face an interior of the vehicle 25. The vehicle 25 is depicted in FIG. 2 as a sedan automobile, but can alternatively be a truck, van, boat, an aircraft, a spacecraft, a train, or any combination(s) thereof.

Figure 3:
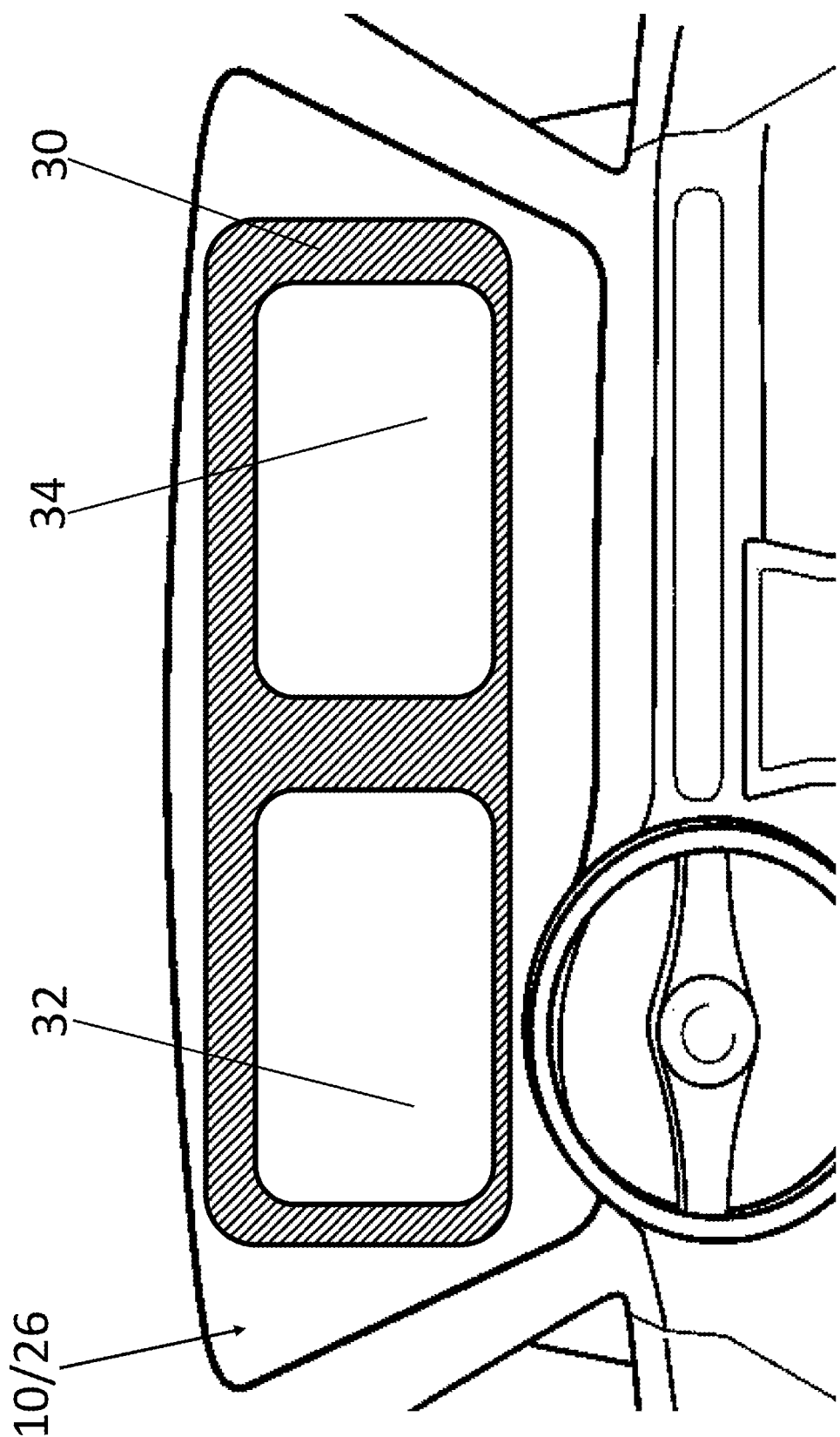
FIG. 3 is an interior perspective view of a vehicle windshield according to an exemplary embodiment.

Now referring to FIG. 3, a front windshield 26 (made from the multilayer panel 10 of FIG. 1) is shown. The first polymer layer of the multilayer panel 10, the second polymer layer of the multilayer panel 10, or any combination(s) thereof, can comprise two or more materially distinct zones (30, 32, and 34). "Materially distinct" can refer to a zone which comprises different material as compared to another zone. For example, the materially distinct zones (30, 32, and 34) can comprise graphene, tungsten wiggle wire, metal nanowire, or any combination(s) thereof. The materially distinct zones (30, 32, and 34) can be, for example, zone A (30), zone B (32), and zone C (34). For example, zone A (30) can comprise graphene, zone B (32) can comprise graphene and metal nanowire, and zone C (34) can comprise graphene and metal nanowire. For example, zone B (32) can represent a driver's forward field of vision. Use of differing materials for each zone can result in differing thermal conductivities for each zone. For example, not wishing to be bound by theory, addition of metal nanowire to zone B can increase the thermal conductivity of zone B. For example, a thermal conductivity of zone B (32), zone C (34), or any combination(s) thereof, can be greater than a thermal conductivity of zone A (30). The materially distinct zones (30, 32, and 34), with varied thermal conductivities, can allow for localized defrosting of the front windshield 26, wherein one zone is heated more than another, as needed, thus improving overall heating efficiency. For example, zone A (30) can defrost in less than or equal to 40 minutes, zone B (32) can defrost in less than or equal to 20 minutes, and zone C (34) can defrost in less than or equal 25 minutes. The defrost speed can be measured by any suitable method, for example, a method in accordance with Federal Motor Vehicle Safety Standards, Section 571.103, Standard No. 103 (2011).

Figure 4:
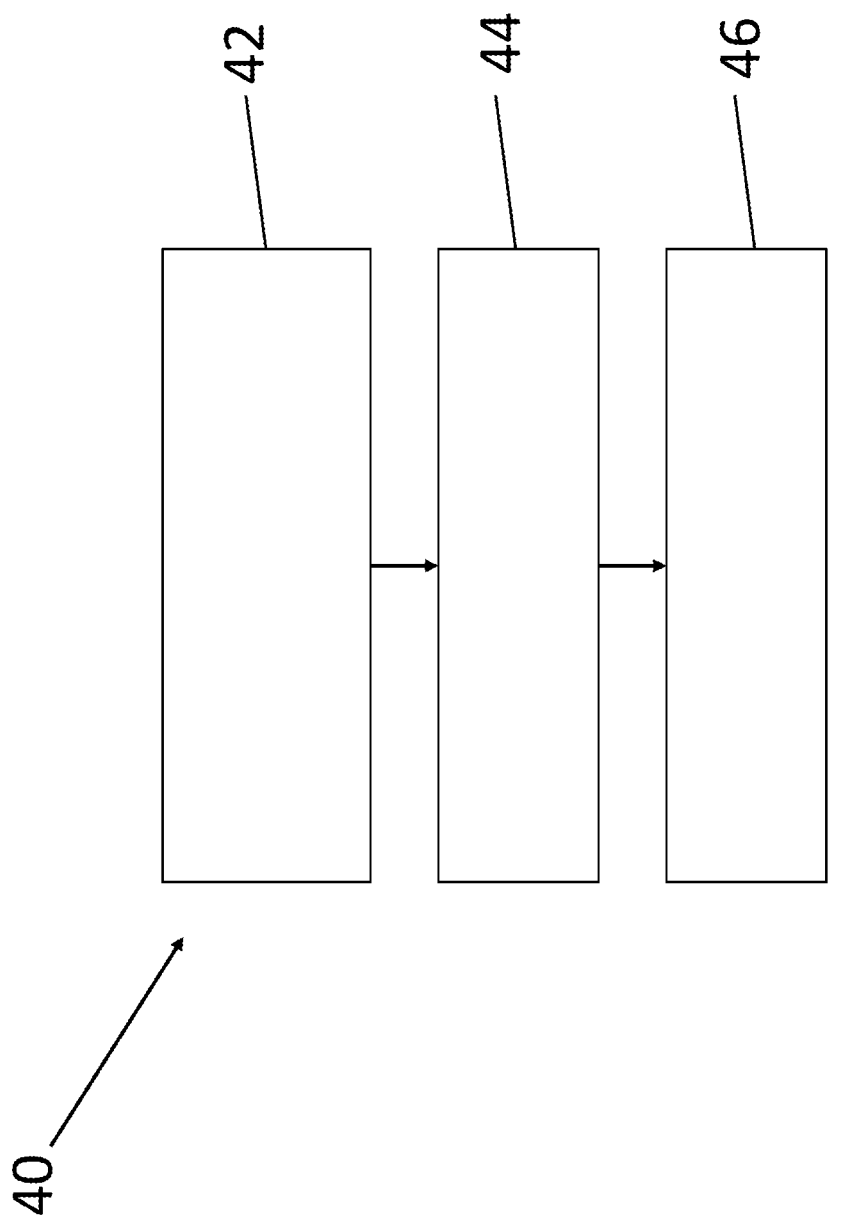
FIG. 4 is a flow diagram representing a method of making a multilayer panel according to an exemplary embodiment.

Now referring to FIG. 4, a method 40 of making the multilayer panel 10 can comprise step 42: combining a polymer, a carbon filler, and a plasticizer to form the first polymer layer 14 and second polymer layer 15. The method 40 can further comprise step 44: depositing the polymer layers 14 and 15 on the respective opposing surfaces 12 and 13 of the center layer 11. The method 40 can further comprise step 46: laminating the polymer layers (14, 15) and center layer 11 between the first and second glass layers (16, 18).

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components (and encompasses "consist(s) of", "consisting of", "consist(s) essentially of" and "consisting essentially of"), but do not necessarily preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A multilayer panel, comprising:
   a center layer comprising a single layer of graphene or multiple layers of graphene, wherein the center layer comprises a first surface and an opposing second surface;
   a first polymer layer deposited on the first surface of the center layer and a second polymer layer deposited on the second surface of the center layer; and
   a first glass layer deposited on an outer surface of the first polymer layer and a second glass layer deposited on an outer surface of the second polymer layer;
   wherein the first polymer layer, the second polymer layer, or any combination(s) thereof comprise carbon filler wherein the carbon filler comprises graphene, carbon nano ribbons, carbon nano platelets, single-walled carbon nano tubes, multi-walled carbon nano tubes, expanded graphite, carbon fiber, or any combination(s) thereof; wherein an electrical conductivity of the multilayer panel is greater than or equal to about 0.05 Siemens per meter when measured in accordance with ISO 9944:1990, and wherein a visible light transmission value of the multilayer panel is greater than or equal to about 70%.

2. The multilayer panel of claim 1, wherein the first polymer layer, the second polymer layer, or any combination(s) thereof, comprise polyvinyl butyral, ethylene-vinyl acetate, ethylene-methacrylic acid, or any combination(s) thereof.

3. The multilayer panel of claim 1, wherein the first polymer layer, the second polymer layer, or any combination(s) thereof, comprise two or more materially distinct zones.

4. The multilayer panel of claim 3, wherein the materially distinct zones comprise graphene, tungsten wiggle wire, metal nanowire, or any combination(s) thereof.

5. The multilayer panel of claim 1, wherein the first polymer layer, the second polymer layer, or any combination(s) thereof, comprise about 0.1 weight percent to about 10 weight percent of the carbon filler based on a total weight of the respective polymer layer.

6. The multilayer panel of claim 1, wherein a thermal conductivity of the multilayer panel is greater than or equal to about 10 watts per meter kelvin.

7. The multilayer panel of claim 1, wherein a thickness of the center layer is about 1 nanometer to about 1.2 nanometers.

8. The multilayer panel of claim 1, wherein a thickness of the first polymer layer, the second polymer layer, or any combination(s) thereof is about 0.38 millimeters to about 0.76 millimeters.

9. The multilayer panel of claim 1, wherein a thickness of the first glass layer, the second glass layer, or any combination(s) thereof is about 1.4 millimeters to about 2.3 millimeters.

10. The multilayer panel of claim 1, wherein the first glass layer, the second glass layer, or any combination(s) thereof, comprise annealed glass.

11. The multilayer panel of claim 1, wherein an electrical conductivity of the multilayer panel is greater than or equal to about 0.1 Siemens per meter.

12. The multilayer panel of claim 1, wherein the first polymer layer, the second polymer layer, or any combination(s) thereof, comprise about 0.1 weight percent to about 10 weight percent of a plasticizer based on a total weight of the respective polymer layer, wherein the plasticizer comprises phthalate, terephthalate, trimellitate, adipate, epoxy, or any combination(s) thereof.

13. The multilayer panel of claim 1, wherein a glass transition temperature of the first polymer layer, the second polymer layer, or any combination(s) thereof is greater than or equal to about 20° C.

14. A multilayer panel comprising:
    a center layer comprising a single layer of graphene or multiple layers of graphene, wherein the center layer comprises a first surface and an opposing second surface;
    a first polymer layer deposited on the first surface of the center layer and a second polymer layer deposited on the second surface of the center layer; and
    a first glass layer deposited on an outer surface of the first polymer layer and a second glass layer deposited on an outer surface of the second polymer layer;
    wherein the first polymer layer, the second polymer layer, or any combination(s) thereof comprise carbon filler,
    wherein the first polymer layer, the second polymer layer, or any combination(s) thereof, comprise two or more materially distinct zones, wherein the materially distinct zones are a zone A, a zone B, and a zone C, wherein the zone A comprises graphene, the zone B comprises graphene and metal nanowire, and the zone C comprises graphene and metal nanowire.

15. The multilayer panel of claim 14, wherein a thermal conductivity of the zone B, the zone C, or any combination(s) thereof, is greater than a thermal conductivity of the zone A.

16. A vehicle, comprising:
    a multilayer panel in electrical connection with an electricity source, wherein the multilayer panel is a front windshield, rear windshield, side door window, roof window, or any combination(s) thereof; and
    wherein the multilayer panel comprises:
    a center layer comprising a single or multiple layers of graphene, wherein the center layer comprises a first surface and an opposing second surface;
    a first polymer layer deposited on the first surface of the center layer and a second polymer layer deposited on the second surface of the center layer; and
    a first glass layer deposited on an outer surface of the first polymer layer and a second glass layer deposited on an outer surface of the second polymer layer;
    wherein the first polymer layer, the second polymer layer, or any combination(s) thereof comprise carbon filler wherein the carbon filler comprises graphene, carbon nano ribbons, carbon nano platelets, single-walled carbon nano tubes, multi-walled carbon nano tubes, expanded graphite, carbon fiber, or any combination(s) thereof; wherein an electrical conductivity of the multilayer panel is greater than or equal to about 0.05 Siemens per meter when measured in accordance with ISO 9944:1990 and wherein a visible light transmission value of the multilayer panel is greater than or equal to about 70%.

17. The vehicle of claim 16, wherein the vehicle is an automobile, a boat, an aircraft, a spacecraft, a train, or any combination(s) thereof.

* * * * *